(12) United States Patent
Hersam et al.

(10) Patent No.: US 9,266,735 B2
(45) Date of Patent: Feb. 23, 2016

(54) SEPARATION OF SINGLE-WALLED CARBON NANOTUBES BY SELF-FORMING DENSITY GRADIENT ULTRACENTRIFUGATION

(75) Inventors: Mark C. Hersam, Wilmette, IL (US); Jung-Woo T. Seo, Evanston, IL (US); Alexander Lee Antaris, Evanston, IL (US); Alexander A. Green, Boston, MA (US)

(73) Assignee: Northwestern University, Evanston, IL (US)

( * ) Notice: Subject to any disclaimer, the term of this patent is extended or adjusted under 35 U.S.C. 154(b) by 767 days.

(21) Appl. No.: 13/507,924

(22) Filed: Aug. 7, 2012

(65) Prior Publication Data

US 2013/0040798 A1 Feb. 14, 2013

Related U.S. Application Data

(60) Provisional application No. 61/574,737, filed on Aug. 8, 2011.

(51) Int. Cl.
| | |
|---|---|
| *C01B 31/02* | (2006.01) |
| *C08L 71/02* | (2006.01) |
| *B01D 21/26* | (2006.01) |
| *B82Y 30/00* | (2011.01) |
| *B82Y 40/00* | (2011.01) |

(52) U.S. Cl.
CPC ............ *C01B 31/0266* (2013.01); *B01D 21/26* (2013.01); *B01D 21/262* (2013.01); *B82Y 30/00* (2013.01); *B82Y 40/00* (2013.01); *C08L 71/02* (2013.01); *C01B 2202/02* (2013.01); *C01B 2202/22* (2013.01); *C01B 2202/30* (2013.01); *C08G 2650/58* (2013.01)

(58) Field of Classification Search
CPC ............ C01B 31/0266; C01B 2202/02; C01B 2202/22; C01B 2202/30; B01D 21/26; B01D 21/162; B82Y 30/00; B82Y 41/00; C08L 71/02; C08G 2650/58
See application file for complete search history.

(56) References Cited

U.S. PATENT DOCUMENTS

| | | | |
|---|---|---|---|
| 7,662,298 B2 | 2/2010 | Hersam et al. | |
| 9,034,213 B2 * | 5/2015 | Hersam et al. | ........... 252/511 |
| 2009/0324483 A1 | 12/2009 | Doorn et al. | |
| 2011/0155964 A1 | 6/2011 | Arnold et al. | |

FOREIGN PATENT DOCUMENTS

| | | |
|---|---|---|
| JP | 2010001162 | 7/2010 |
| WO | 2006096613 A2 | 9/2006 |
| WO | 2008073171 A2 | 6/2008 |

OTHER PUBLICATIONS

Feng, Ye et al., "High-Efficiency Separation of Single-Wall Carbon Nanotubes by Self-Generated Density Gradient Ultracentrifugation", published Jan. 12, 2011, J. Phys. Chem. C 2011, 115, 1752-1756.
Antaris, AL; Jung-Woo, TS; Green, AA; Hersam, MC. Sorting Single-Walled Carbon Nanotubes by Electronic Type Using Nonionic, Biocompatible Block Copolymers. ASCNANO, vol. 4, No. 8 pp. 4725-4732 2010.
International Search Report dated Feb. 13, 2013.

* cited by examiner

*Primary Examiner* — David A Reifsnyder
(74) *Attorney, Agent, or Firm* — Reinhart Boerner Van Deuren S.C.

(57) ABSTRACT

The separation of single-walled carbon nanotubes (SWCNTs), by electronic type, using centrifugation of compositions of SWCNTs and surface active block copolymers in self-forming density gradient media.

31 Claims, 7 Drawing Sheets

SEPARATION OF SINGLE-WALLED CARBON NANOTUBES BY SELF-FORMING DENSITY GRADIENT ULTRACENTRIFUGATION

This application claims priority benefit from application Ser. No. 61/574,737 filed Aug. 8, 2011—the entirety of which is incorporated herein by reference.

This invention was made with government support under grant numbers DMR0520513 and DMR1006391 awarded by the National Science Foundation. The government has certain rights in the invention.

BACKGROUND OF THE INVENTION

Single-walled carbon nanotubes (SWCNTs) have, over the past several years, generated considerable interest as a result of their mechanical and electronic properties. SWCNTs can be one of two electronic types, either metallic or semiconducting, depending on their chirality. Significant progress has been made at controlling SWCNT structure during nanotube growth, but post-synthetic processing steps are still required to extract carbon nanotubes of particular electronic types at high purity levels. In order to achieve the wide-spread industrial use envisioned for SWCNTs, semiconducting and metallic species must be isolated efficiently and at extremely high purities. While methods exist to separate both semiconducting and metallic SWCNTs, much of the interest in carbon nanotubes lies in their semiconducting applications. For instance, incorporation of semiconducting single-walled carbon nanotubes has shown to improve the functionality of a diverse array of technologies ranging from transistors to molecular detectors. Numerous separation techniques have been developed, including electrophoresis, gel chromatography and DNA wrapping. One particular prior separation method, density gradient ultracentrifugation (DGU), involves several time-consuming and labor-intensive steps, including the creation of a linear density gradient. Furthermore, the extraction of high purity semiconducting species requires complex fractionation procedures and associated equipment costs.

Improving the fidelity and yield of DGU separations has proven to be an often laborious process. Accordingly, there remains an on-going effort in the art to develop a nanotube separation system to better utilize the benefits available through DGU.

SUMMARY OF THE INVENTION

In light of the foregoing, it is an object of the present invention to provide one or more methods and/or systems relating to the separation of carbon nanotubes, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be another object of this invention to provide methods and related systems for carbon nanotube separation as a function of electronic type, regardless of diameter and/or chirality.

It can be another object of this invention to provide a range of polymeric surface active components and use thereof to engineer differences in nanotube buoyant densities, such that a mixture of nanotubes can be separated as a function of electronic type.

It can be another object of this invention to provide a range of surface active block copolymers that can be rationally designed and tailored to control and/or enhance separation of single-walled carbon nanotubes by electronic type.

It can be another object of this invention, alone or in conjunction with one or more of the preceding objectives, to provide a biocompatible, nonionic block copolymer, such that selectively separated carbon nanotubes can be utilized in various biological and/or in vivo applications.

Other objects, features, and advantageous of the present invention will be apparent from the summary and the following descriptions of certain embodiments, and will be readily apparent to those skilled in the art knowledgeable regarding the production and properties of carbon nanotubes and related separation techniques. Such objects, features, benefits and advantages will be apparent from the above as taken into conjunction with the accompanying examples, data, figures and all reasonable inferences to be drawn there from, alone or with consideration of the references incorporated herein.

In part, this invention can be directed to a method of using a density gradient to separate carbon nanotubes. Such a method can comprise providing a system comprising a fluid self-forming density gradient medium, a composition comprising a mixture of single-walled carbon nanotubes of varying electronic type (i.e., semiconducting and metallic), and an amphiphilic surface active block copolymer component; and centrifuging the system for a time and/or rotational rate at least partially sufficient to separate the nanotube mixture along a medium gradient formed upon centrifugation. Such a method is without limitation as to nanotube identity, whether a mixture of chiralities, diameters or otherwise. The nanotubes fraction(s) selectively separated and/or isolated can be identified spectrophotometrically and/or fluorimetrically, with such identification comprising comparison of absorbance and/or emission spectra respectively with a corresponding reference spectrum.

The carbon nanotubes can be provided in composition with a nonionic, poly(ethylene oxide)-containing polymer of the sort understood by those skilled in the art made aware of this invention. Generally, such a polymer component can function, in conjunction with a particular fluid medium, to reduce nanotube aggregation. In certain embodiments, such a component can be selected from a wide range of nonionic amphiphiles. In certain non-limiting embodiments, such a polymeric component can comprise a relatively hydrophilic poly(ethylene oxide) (PEO) group and a relatively hydrophobic moiety. In certain other non-limiting embodiments, such a component can be selected from various linear block poly (alkylene oxide) copolymers. In certain such embodiments, such poly(alkylene oxide) copolymer components can be X-shaped and/or coupled with a linker such as but not limited to an alkylene diamine moiety. Regardless, without limitation, such copolymer components can comprise PEO and poly(propylene oxide) (PPO) blocks, as discussed more fully, below. More generally, such embodiments are representative of a broader group of polymeric surface active components capable of providing a structural configuration about and upon dynamic interaction with carbon nanotubes in a fluid medium, as can induce differential nanotube buoyant density.

Fluid media useful with this invention are limited only by a) carbon nanotube aggregation therein and b) insufficient density change upon centrifugation—each alone or in conjunction with the other to an extent precluding at least partial separation. Accordingly, without limitation, aqueous and non-aqueous fluids can be used in conjunction with any substance soluble or dispersible therein, over a range of concentrations so as to provide a density gradient for use in the separation techniques described herein. Such substances can be ionic or nonionic, non-limiting examples of which include inorganic salts and alcohols, respectively. In certain embodiments, as illustrated more fully below, such a medium can comprise various aqueous iodixanol concentrations and corresponding medium densities. Likewise, the methods of this invention can be influenced by gradient slope, as affected by length of centrifuge compartment and/or angle of centrifugation.

Regardless of medium identity or initial/starting density, one or more of the aforementioned nanotube compositions can be introduced to the medium, with a nanotube mixture sorted through a self-forming density gradient during centrifugation. Such a starting density can be used to advantageously control a final density profile corresponding to different buoyant densities of the polymer-nanotube composition(s) introduced thereto. Variation in initial starting density can, upon centrifugation, provide a sufficient buoyant density separation between semiconducting and metallic nanotube components.

Upon sufficient centrifugation, at least one fraction of the medium or nanotube mixture can be separated and/or isolated from the medium, such fraction(s) as can be isopycnic at a position along the gradient. An isolated fraction can correspond to nanotubes produced by one or more techniques known in the art, identified by dimension, chirality, chemical characteristic or electronic type corresponding thereto. Regardless, any such medium and/or nanotube fraction can be used, or optionally reintroduced to another fluid medium, for subsequent refinement or separation. Accordingly, such a method of this invention can comprise repeating or iterative centrifuging, separating and isolation. In certain embodiments, medium conditions or parameters can be maintained from one separation to another. In certain other embodiments, however, at least one iterative separation can comprise a change of one or more parameters, such as but not limited to the identity of the surface active component(s), medium identity, medium density gradient and/or various other medium parameters with respect to one or more of the preceding separations.

In part, the present invention can also be directed to a method of using a surface active block copolymeric component to alter carbon nanotube buoyant density and effect separation thereof. Such a method can comprise providing a system comprising a fluid self-forming density gradient medium, a composition comprising a mixture of single walled carbon nanotubes varying at least by electronic type, and at least one surface active block copolymeric component, to provide differential buoyant density; centrifuging the system for a time and/or at a rotational rate at least partially sufficient to separate the mixture by buoyant density along a gradient formed during centrifugation; and selectively separating by electronic type one group or fraction of the nanotube mixture from the system. Useful fluid medium and substances incorporated therein, together with surface active components, can be as described elsewhere herein. With regard to the latter, and but one distinction over the prior art, differential buoyant density can be altered or modulated by a single surface active component, such contact and/or interaction as can be a function of electronic type.

Where such nanotubes comprise varying diameters and/or at least two chiralities, the selection can comprise iterative centrifugation, separation and isolation, to further partition the nanotubes along a gradient. In so doing, at least one such separation can vary by change in surface active component, medium identity, medium density gradient, and/or various other medium parameters, from one or more of the preceding separations.

Regardless, such a block copolymeric component can be of the sort discussed herein and/or illustrated more fully below. In certain such embodiments, such a component can comprise hydrophilic and hydrophobic poly(alkylene oxide) blocks. Without limitation, whether or not coupled by an alkylene diamine linker moiety, such copolymer components can comprise hydrophilic PEO and hydrophobic PPO blocks. In certain such embodiments, separation by electronic type can be enhanced by increasing hydrophilic block length (e.g., up to about 40-about 50 or more ethylene oxide units per block) relative to hydrophobic block length. From another perspective, electronic-type purity and separation efficiency can be inversely related to hydrophobic block length.

In part, the present invention can also be directed to a system and/or method for separation of carbon nanotubes. Such a system can comprise a fluid self-forming density gradient medium; and a composition comprising at least one amphiphilic—and, optionally, a single—surface active polymeric component of the sort described herein and a mixture of single-walled carbon nanotubes comprising semiconducting and metallic electronic types. Upon centrifugation, nanotubes can be positioned along a self-formed density gradient. Independent of mixture chirality, diameter or any other structural or physical characteristic, such a system can comprise and be used to selectively separate one or more fractions enriched with semiconducting or metallic carbon nanotubes. Regardless, such a self-forming density gradient medium and a surface active component can be independently selected in view of the considerations discussed elsewhere herein.

Accordingly, without limitation, such a composition can comprise a mixture of single-walled nanotubes and a poly (alkylene oxide) block copolymer component. In certain embodiments, such a copolymer component can comprise PEO and PPO blocks, optionally coupled by an ethylene diamine linker moiety. Without limitation, such a polymeric component can comprise more than about 10-about 15 or more monomeric ethylene oxide units per PEO block. Regardless, after separation, the nanotube component of such a composition can be isolated for further analysis, fabricated into a film and/or incorporated into an electronics device or used in vivo, as would be understood by those skilled in the art made aware of this invention.

DETAILED DESCRIPTION OF CERTAIN EMBODIMENTS

Figure 1:
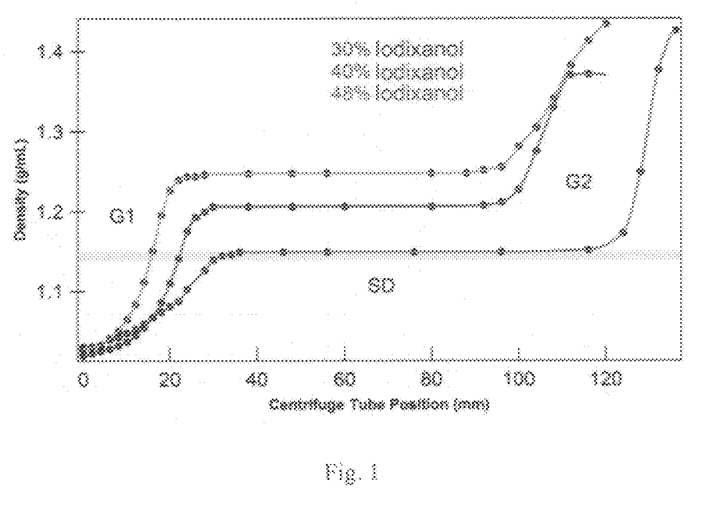
FIG. 1. Final Density Profile of Constant Initial Densities. Density profiles of three different centrifuge tubes after ultracentrifugation. The initial starting density controls the final density profile including the slope of the G1 and G2 region and the start/end points of the SD zone. The yellow shaded region highlights the density range where the semiconducting SWCNT band is localized; i.e., between about 1.14 and about 1.15 g/ml.
Figure 2A:
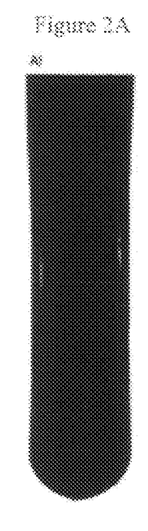
FIGS. 2A-C: Semiconducting Block Copolymer SWCNT Sorting. Digital images of (A) a centrifuge tube before ultracentrifugation at a constant density of 40% iodixanol, (B) after 12 hours, where a reddish-brown color throughout the tube indicates preferential semiconducting suspension, and (C) after 24 hours, a dark red band forms near the top of the tube containing highly enriched semiconducting SWCNTs. The absence in the top band and the suppression near the bottom of the tube of metallic SWCNT peaks, whose transition are highlighted by the yellow shaded region, indicate highly purified semiconducting SWCNT species. Dashed gray curve is the absorbance spectra of unsorted SWCNTs, spectra are offset for clarity.
Figure 2B:
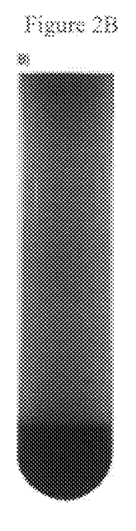
Figures 2C, 3C:
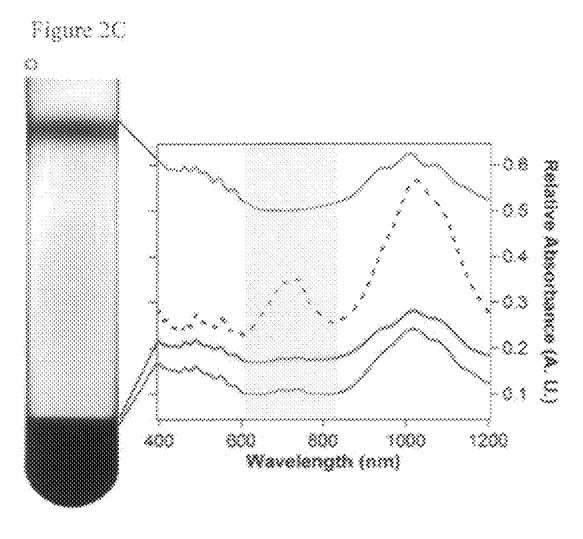

Illustrating various non-limiting embodiments of this invention, sorting of SWCNTs by electronic type can be achieved via self-forming density gradient ultracentrifugation (SDGU) where the starting density controls the final density profile (FIG. 1). SDGU exploits the different buoyant densities for polymer-wrapped semiconducting versus metallic and bundled SWCNTs. For instance, depending on the particular block copolymer(s) utilized, semiconducting SWCNTs can have densities ranging from about 1.14-about 1.15 g/mL while metallic and unsorted material sit at densities below about 1.25 g/mL. By fine-tuning the initial starting density, the large buoyant density separation between semiconducting and unsorted species allows for the suspension of semiconducting SWCNTs while pelleting unsorted material (FIG. 2). By adjusting the starting density of the initial SWCNT solution, this invention can effectively act as a high density filter where polymer-wrapped SWCNTs above a particular density threshold are eliminated. (As a preliminary step, the present semiconducting sorting method can first start with the ultrasonication of SWCNTs, block copolymers, and iodixanol at a selected nanotube concentration and initial starting density. Once dispersed in an aqueous environment, SWCNT solutions are diluted to a constant, initial starting density and poured into an ultracentrifuge tube.)

Through the nonlinear force distribution acting on the iodixanol molecules during ultracentrifugation, an S shaped density profile becomes noticeable after 12 hours of ultracentrifugation. Iodixanol depletion near the top of the centrifuge tube produces a starting density close to that of water while a concentration of iodixanol molecules near the bottom of the centrifuge tube produces densities greater than 1.32 g/mL. Near the top of the centrifuge tube, a quickly changing density gradient (G1) levels out to approximately the initial starting density (SD). A final density gradient exists near the bottom of the tube (G2) due to the SD zone changing to the highly concentrated iodixanol region. As indicated in FIG. 2, choosing an SD value involves selecting for a density greater than that of the semiconducting density range in order for G1 to capture semiconducting species while setting SD below that of unsorted material so as to disallow impurities from travelling from G2 to G1. At an initial sorting density of 40% iodixanol, semiconducting SWCNTs were extracted at purities higher than 99.5% with efficiencies greater than 2.5%.

SDGU introduces a number of significant improvements over existing density gradient ultracentrifugation (DGU) methods: 1) no pre-separation pelleting step is required, 2) no complex system of co-surfactants is required 3) no pre-centrifugation preparation of a linear density gradient is required, 4) a fractionator is not required to extract purified SWCNTs, 5) the density media between G1 and G2 is recyclable, and 6) the biocompatibility of block copolymers as dispersion agents allows the facile transition of semiconducting SWCNTs into biomedical applications. SDGU removes the time-intensive step of creating the linear density gradient, uses inexpensive, mass produced surfactants, and significantly reduces density gradient medium costs due to the recyclability of iodixanol between G1 and G2.

This sorting technique has also proven to be easily scalable. Centrifuge tubes with volumes ranging between 12 and 38 mL show identical sorting behavior. As the suspended semiconducting purity and extraction efficiency are a function of ultracentrifugation time and the initial starting density, larger volume runs are possible. Accordingly, this invention can be used with ease to meet production cost requirements for commercial scale batch production of extremely high purity, semiconducting SWCNTs.

Figure 3:
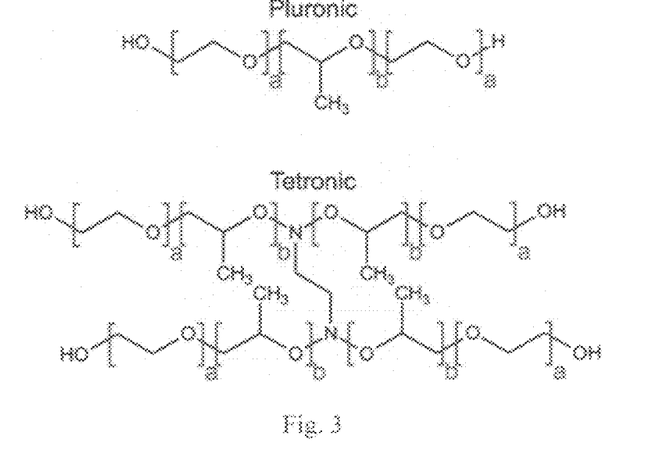
FIG. 3. Generic molecular structures for Pluronic® and Tetronic® copolymers, of the sort useful in conjunction with certain non-limiting embodiments of this invention.

Representative SWCNT separations can employ three distinct classes of nonionic amphiphiles that have been widely studied theoretically outside the context of SDGU: Triton™-type polyethoxylates, and Pluronic® and Tetronic®-type block copolymers. Triton polymeric compounds are characterized by a PEO group and a hydrocarbon moiety such as octyl phenolate. With reference to FIG. 3, pluronic copolymers are linear molecules composed of a central hydrophobic polypropylene oxide (PPO) group flanked by two hydrophilic polyethylene oxide (PEO) chains. Tetronic copolymers, on the other hand, are X-shaped copolymers formed by four individual PPO-PEO blocks bonded to a central ethylene diamine linker. As understood in the art, both copolymers are conveniently named following the relative composition of their polymer blocks. The names of Pluronics begin with a letter that designates their state at room temperature (flake, paste, or liquid), followed by a set of two or three digits. The last of these digits multiplied by 10 denotes the percentage by weight of the PEO block, whereas the earlier digits multiplied by 300 correspond to the approximate average molecular weight of the PPO block. For example, Pluronic F68 exists in flake form at room temperature, consists of 80% PEO by molecular weight, and contains a PPO block with approximate molecular weight of 1800 Da. Tetronics follow a similar naming convention in which the last digit of their name multiplied by 10 designates the percentage by weight of their hydrophilic segments, whereas the earlier digits multiplied by 45 provide the approximate molecular weight of the PPO block. Without limitation to any one theory or mode of operation, in graphene suspensions, the hydrophobic PPO segments are believed to interact strongly with the graphene faces leaving the hydrophilic PEO chains free to interface with other nearby PEO chains and the surrounding aqueous environment.

Unlike the anionic surfactants typically employed in prior art SDGU separations of the prior art, both Pluronic® and Tetronic® block copolymer classes are available in a large number of different structural permutations established through independent control of their terminal moieties, hydrophilic and hydrophobic chain lengths. Pluronic-SWCNT suspensions have generated recent interest due to their biocompatibility, self-assembly, and amenability to theoretical modeling. Previous studies have shown that the dispersion efficiency of a Pluronic depends strongly on the relative lengths of the PEO and PPO copolymer segments and that the hydrophobic PPO chains adhere to the SWCNT surface while the hydrophilic chains extend into solution. Structural variations and corresponding surface active effects are also available through the numerous polyethoxylate compounds commercially-available.

Beyond providing a more efficient SDGU system, the present results can also be used to provide some insight on amphiphile-SWCNT interactions, especially so between block copolymers and SWCNTs. The buoyant density of the polymer-SWCNT complex varies as a function of the diameter, wrapping angle, electronic type, and bundling of the SWCNTs; the ordering and surface coverage of the polymer on the SWCNT sidewalls; and the organization of water and hydrophilic polymer regions in the outer region of the complex. Following SDGU, the buoyant density of the separated SWCNTs can be measured directly and their chirality distribution determined spectroscopically. As Pluronics and Tetronics have an affinity for SWCNTs of different electronic types—semiconducting and metallic, respectively, SDGU provides a readily accessible and sensitive platform for selective SWCNT separations.

Furthermore, the yield and purity of the SWCNTs extracted following separations can vary systematically with the block copolymer structure, e.g., reaching purities greater than 99% semiconducting SWCNTs for a certain Pluronic copolymer. These results show that such block copolymers represent a class of dispersion agents for SDGU-based SWCNT separations with structures that can be rationally tailored to enhance the degree of SWCNT enrichment. Correlation between copolymer structure, SWCNT interaction, resulting buoyant densities and ultimate separation is more fully discussed in co-pending application Ser. No. 13/134, 167 filed May 31, 2011, the entirety of which is incorporated herein by reference. Accordingly, a range of commercially-available Pluronic (e.g., without limitation, those under the F68, F77, F87, F88, F98, F108 and F127 trade designations) and Tetronic (e.g., without limitation, those under the 1301, 901, 304, 1107, 904, 1307 and 908 trade designations) block copolymers can be used depending on desired SWCNT separation.

As described herein, it should be understood that isolating a separation fraction typically provides complex(es) formed by the surface active component(s) of single-walled carbon nanotubes, whereas post-isolation treatment, e.g., removing the surface active component(s) from the SWCNTs such as by washing, dialysis and/or filtration, can provide substantially pure or bare single-walled carbon nanotubes. However, as used herein for brevity, reference may be made to single-walled carbon nanotubes rather than the complexes and such reference should be interpreted to include the complexes as understood from the context of the description unless otherwise stated that non-complexed single-walled carbon nanotubes, e.g., bare SWCNTs, are meant.

As used herein, a substantially semiconducting separation fraction refers to a separation fraction that includes a majority of or a high concentration or percentage of semiconducting single-walled carbon nanotubes. For example, the substantially semiconducting separation fraction can include a higher concentration or percentage of semiconducting single-walled carbon nanotubes than the mixture. Similarly, as used herein, a substantially metallic separation fraction refers to a separation fraction that includes a majority of or a high concentration or percentage of metallic single-walled carbon nanotubes. For example, the substantially metallic separation fraction can include a higher concentration or percentage of metallic single-walled carbon nanotubes than the mixture.

In some embodiments, a separation fraction can be substantially monodisperse in terms of electronic type (e.g., greater than about 70%, including greater than about 75%, greater than about 80%, greater than about 85%, greater than about 90%, greater than about 92%, greater than about 93%, greater than about 97% and greater than about 99%, of the single-walled carbon nanotubes in a population of single-walled carbon nanotubes can be semiconducting, or greater than about 50%, including greater than about 75%, greater than about 90%, greater than about 97%, and greater than about 99%, of the single-walled carbon nanotubes in a population of single-walled carbon nanotubes can be metallic). In some embodiments, a separation fraction can be substantially monodisperse in terms of chirality (e.g., greater than about 30%, including greater than about 50%, greater than about 75%, and greater than about 90%, of the single-walled carbon nanotubes in a population of single-walled carbon nanotubes can include the same chirality (n, m) type).

More specifically, selectivity made possible by the present teachings can also be indicated by separation of carbon nanotubes where > about 33% of such separated carbon nanotubes are metallic or > about 67% of such separated carbon nanotubes are semiconducting. For example, in some embodiments, the present teachings can provide a population of carbon nanotubes in which >99.9%, >99%, >97%, >95%, >92%, >90%, >85%, >80%, >75%, >50%, or >33% of the carbon nanotubes can be metallic. In other embodiments, the present teachings can provide a population of carbon nanotubes in which >99.9%, >99%, >97%, >95%, >92%, >90%, >85%, >80%, >75%, or >67% of the carbon nanotubes can be semiconducting. In certain embodiments, the present teachings can provide a population of carbon nanotubes in which >50% of the carbon nanotubes can be metallic. In certain embodiments, the present teachings can provide a population of carbon nanotubes in which >70% of the carbon nanotubes can be semiconducting.

Upon sufficient centrifugation (i.e., for a selected period of time and/or at a selected rotational rate at least partially sufficient to separate the carbon nanotubes along the medium gradient), at least one separation fraction including separated single-walled carbon nanotubes can be separated from the medium. Such fraction(s) can be isopycnic at a position along the gradient. An isolated fraction can include substantially monodisperse single-walled carbon nanotubes, for example, in terms of at least one characteristic selected from nanotube diameter dimensions, chiralities, and electronic type. Various fractionation techniques can be used, including but not limited to, upward displacement, aspiration (from meniscus or dense end first), tube puncture, tube slicing, cross-linking of gradient and subsequent extraction, piston fractionation, and any other fractionation techniques known in the art.

The medium fraction and/or nanotube fraction collected after one separation can be sufficiently selective in terms of separating the carbon nanotubes by the at least one selected property. However, in some embodiments, it can be desirable to further purify the fraction to improve its selectivity. Accordingly, in some embodiments, methods of the present teachings can include iterative separations. Specifically, an isolated fraction can be provided in composition with the same surface active component system or a different surface active component system, and the composition can be contacted with the same fluid medium or a different fluid medium, where the fluid medium can form a density gradient that is the same or different from the fluid medium from which the isolated fraction was obtained. In certain embodiments, fluid medium conditions or parameters can be maintained from one separation to another. In certain other embodiments, at least one iterative separation can include a change of one or more parameters, such as but not limited to, the identity of the surface active component(s), medium identity and/or formed medium density gradient with respect to one or more of the preceding separations. Accordingly, in some embodiments of the methods disclosed herein, the choice of the surface active component can be associated with its ability to enable iterative separations, which, for example, is considered not possible for DNA wrapped SWCNTs (due to, in part, the difficulties in removing the DNA from the SWCNTs).

In certain embodiments, such as separations by chirality or electronic type, the present methods can include multiple iterations of density gradient centrifugation, whereby the degree of separation by physical and electronic structure can improve with each iteration. For instance, removal of undesired chiralities can be effected by successively repetitive density gradient centrifugation. Additionally, the surfactant(s) encapsulating the SWCNTs can be modified or changed between iterations, allowing for even further refinement of separation, as the relationship between density and the physical and electronic structure will vary as a function of any resulting surfactant/encapsulation layer. Separation fractions isolated after each separation can be washed before further complexation and centrifugation steps are performed.

The selectivity of the fraction(s) collected can be confirmed by various analytical methods. For example, optical techniques including but not limited to spectroscopic techniques such as spectrophotometric analysis and fluorimetric analysis can be used. Such techniques generally include comparing one or more absorbance and/or emission spectra with a corresponding reference spectrum. The isolated nanotube fraction generally has a narrower distribution in the variance of the at least one selected property.

EXAMPLES OF THE INVENTION

The following non-limiting examples and data illustrate various aspects and features relating to the methods and systems of the present invention, including the separation of single-walled carbon nanotubes, as can be accomplished through the methodologies described herein. In comparison with the prior art, the present methods and systems provide results and data which was surprising, unexpected and contrary thereto. While the utility of this invention is illustrated through the use of representative self-forming density gradient media and block copolymeric components which can be used therewith, it would be understood by those skilled in the art that comparable results are obtainable with various other media and surface active block copolymeric components, as are commensurate with the scope of this invention.

Example 1

SDGU can be initiated with the suspension of arc-discharge SWCNTs (Carbon Solutions, Inc.) via ultrasonication (Fisher Scientific model 500 Sonic Dismembrator) at a starting density of 1.32 g/mL. (More generally, SWNT source and preparation would be understood by those skilled in the art, as provided in example 1 of U.S. Pat. No. 7,662,298—such example incorporated herein by reference.) This solution is then diluted to 40% iodixanol and ultracentrifuged for 31 hours at 40,000 rpm. (SW 41 Ti rotor, Beckman Coulter, Inc.). All solutions used for sonication and dilution steps have a constant 1% w/v block copolymer loading. SWCNTs migrate to a position within the centrifuge tube where the buoyant density of the polymer-SWCNT complex matches the density of the surrounding medium. The most efficient initial sorting densities produce a gradient whose SD is larger than the buoyant density range of semiconducting SWCNTs but sufficiently low to preclude travel of unsorted material to travel up the tube from G2 to G1.

Example 2

After semiconducting separation, a fractionator (Biocomp Instruments, Inc.) removes contents from the centrifuge tube layer by layer. The collected samples are diluted in a 1% w/v block copolymer solution and subsequently characterized by optical absorbance spectroscopy. While a fractionator is not required for an optimized starting density (40% iodixanol), higher initial densities suspend lower purity semiconducting SWCNTs in the top band. Fractionation extracts a precise volume from a known position within the centrifuge tube allowing for the accurate comparison between all starting densities and simplifies the calculations necessary to obtain sorting efficiencies. At the optimized starting density, a Pasteur pipette is inserted directly below the semiconducting band to manually remove the SWCNTs.

Example 3

The optical absorbance spectra of SWCNTs extracted from the top band indicate purities in excess of 99.5% (FIG. 2). The purity of a fraction is determined by comparing the area under the second order semiconducting transitions (900-1270 nm) to the area under the first order metallic transitions (600-850 nm). SDGU's current yield of manually extractable 99.5% semiconducting SWCNTs is 2.57%, which is comparable to the 3.9% efficiency previously achieved using DGU and block copolymers. Through further optimization steps, it is likely that SDGU will match if not exceed DGU in terms of its extraction efficiency.

Example 4a

The SDGU separations demonstrated herein utilize block copolymers, specifically Pluronic F68—a linear ABA style block copolymer composed of two hydrophilic polyethylene oxide (PEO) chains flanking a shorter, central hydrophobic polypropylene oxide (PPO) segment. However, as discussed above, other Pluronic copolymers that yield bi-modal distribution patterns using DGU can produce similar results.

Because SDGU separation is a function of density difference between a chosen electronic type and unsorted material, the advantages associated with this invention can be realized without limitation to any one copolymer surfactant.

Example 4b

While SWCNT dispersion has been demonstrated with various Pluronic and Tetronic tri-block copolymers, it will be understood by those skilled in the art made aware of this invention that various other linear and non-linear amphiphilic multi-block copolymers can be used effectively, in accordance with this invention. Such copolymers and corresponding polymer blocks can be customized by monomer structure, block molecular weight/length and relative content, depending upon copolymer property, SWCNT dispersion and desired separation. A wide range of such copolymers are either commercially available (e.g., from BASF Corp.) or can be custom synthesized using known synthetic techniques available in the literature or straight-forward modifications thereof, as would be understood by those skilled in the art made aware of this invention.

Example 4c

As understood by those in the art, aqueous iodixanol is a common, widely used non-ionic density gradient medium. However, other media can be used with good effect, as would also be understood by those individuals. More generally, any material or compound stable, soluble or dispersible in a fluid or solvent of choice can be used as a density gradient medium. A range of densities can be formed by dissolving such a material or compound in the fluid, and a density gradient can be formed, then, upon centrifugation. More practically, with regard to choice of medium, the carbon nanotubes, whether or not functionalized, should also be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the particular carbon nanotubes (and/or in composition with one or more surfactants) for a particular medium.

Accordingly, with respect to this invention, any aqueous or non-aqueous density gradient medium can be used providing the single-walled carbon nanotubes are stable; that is, do not aggregate to an extent precluding useful separation. Alternatives to iodixanol include but are not limited to inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as but not limited to Percoll®). Other media useful in conjunction with the present invention would be understood by those skilled in the art made aware of this invention.

Example 5

Figure 4A:
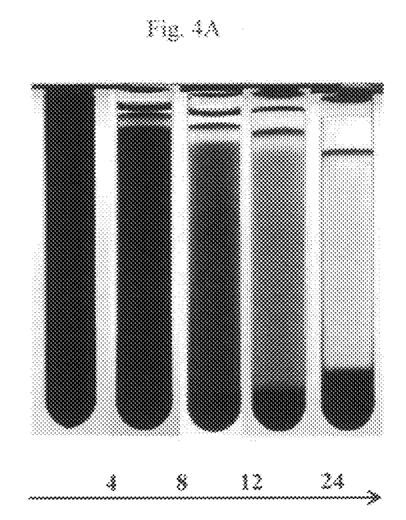
FIGS. 4A-B. Time-evolution of SDGU centrifuge tubes and their density profile. (A) Digital images of centrifuge tubes showing the evolution of a semiconducting SWCNT separation as a function of centrifugation time at 40,000 rpm. A highly enriched SWCNT band is visible after only 4 hours of ultracentrifugation. (B) Plot of the evolution of the density profile within the centrifuge tube at ultracentrifugation times of 4, 12, and 24 hours. The purple band indicates the buoyant density of the semiconducting SWCNTs.

With comparative reference to example 1, modification of the density of the initial gradient medium (i.e., iodixanol) from 40 to 35% w/v in water led to a substantial reduction in ultracentrifugation time to only 4 hours at which point a visible band of highly enriched semiconducting SWCNTs is apparent (FIG. 4A). This time reduction is attributed to the steep gradient slope forming between 0 to 5 mm from the meniscus of the solution inside the centrifuge tube (FIG. 4B), which intersects with the isopycnic point of semiconducting SWCNTs leading to their capture and isolation following fractionation.

Example 6a

Figure 4B:
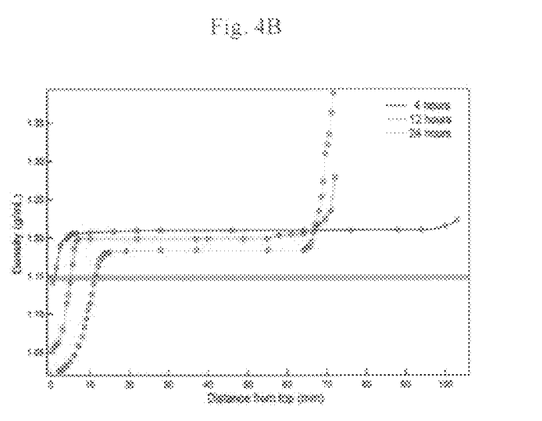

The degree of sorting possible through the SDGU process of example 5 is evident in FIG. 4. The isolated top band after 4 hours of ultracentrifugation contains ~99.9% pure semiconducting SWCNTs, while the middle region (defined here as the portion of the centrifuge tube below 6 mm where the dark region of SWCNTs begins below the isolated band) is still highly enriched at ~97.8% semiconducting purity. The isolation of semiconducting SWCNT samples with both degrees of purities is desirable since exceptional purity is not required in all applications. The sorting yield for the highest purity fractions remains comparable to the SDGU procedure reported above, thereby providing higher throughput extraction of seminconducting SWCNTs through reduction of the ultracentrifugation time by almost 8-fold.

Example 6b

Polymer-complexed or wrapped carbon nanotubes can be separated from their polymeric component by deposition onto $SiO_2$ capped silicon wafers functionalized with (3-aminopropyl)triethoxysilane (Sigma-Aldrich) as described in Green, A. A.; Hersam, M. C., Processing and properties of highly enriched double-wall carbon nanotubes. *Nature Nanotech.* 2009, 4, (1), 64-70, the entirety of which is incorporated herein by reference. Various other polymer removal methods are known in the art, such methods including but not limited to those described in example 16 of the aforementioned '298 patent—such example incorporated herein by reference.

Example 7

Figure 5A:
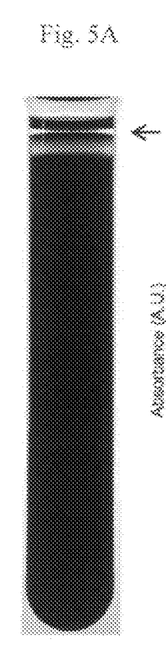
FIGS. 5A-B. Centrifuge tube after 4 hours and the corresponding optical absorbance spectra of the high purity semiconducting SWCNT fractions. (A) Digital image of a centrifuge tube after 4 hours at >40,000 rpm using 35% w/v iodixanol in water. Single band of highly enriched (~99.9% purity) semiconducting SWCNTs is evident at the top of the centrifuge tube. (B) Optical absorbance spectra of SWCNT fractions from the top and middle regions of the centrifuge tube. The suppression of metallic peaks at their optical transitions (650-800 nm) indicates isolation of semiconducting SWCNTs.
Figure 5B:
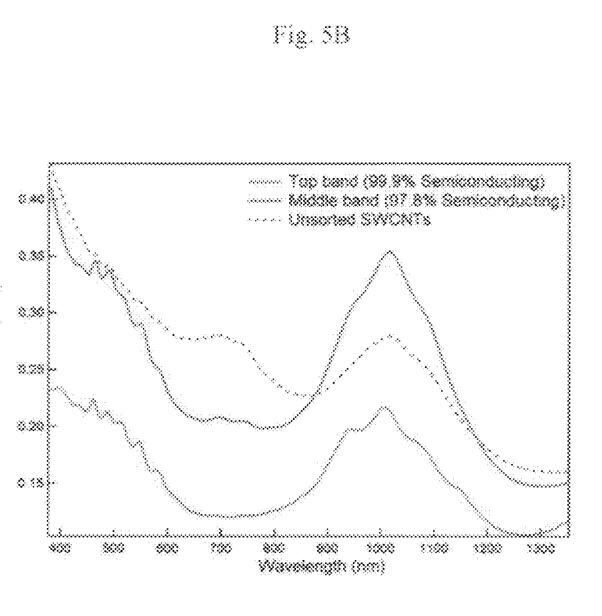
Figure 6A:
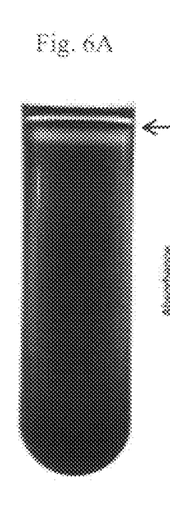
FIGS. 6A-B. Scale-up of SDGU and the corresponding optical absorbance spectra. (A) Digital image of a 38 mL centrifuge tube after 6 hours at 32,000 rpm using 35% w/v iodixanol in water. A single band of highly enriched (~99.9% purity) semiconducting SWCNTs is evident at the top of the centrifuge tube. (B) Optical absorbance spectra of SWCNT fractions from the top and middle regions of the centrifuge tube.
Figure 6B:
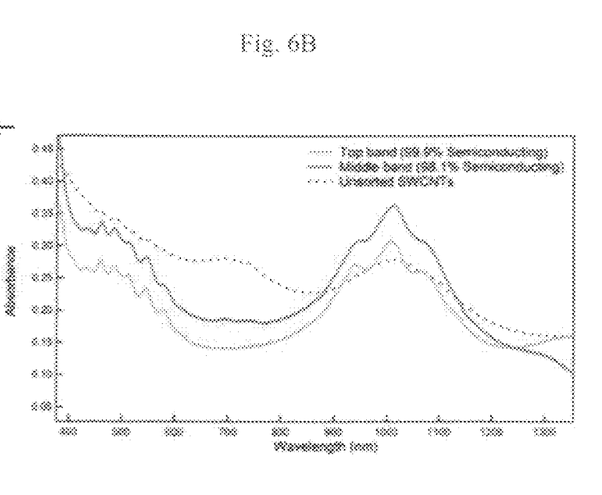

Scalability of SDGU is demonstrated through the use of larger centrifuge tubes with increased capacity from 12 to 38 mL per tube (FIG. 5). This result shows that the volume of extracted samples can be tripled while maintaining similar sorting efficiency and purity. Further scale-ups to larger volumes can be achieved in a straightforward manner by increasing the capacity of the centrifuge as has been demonstrated in the context of conventional DGU.

Example 8

Figure 7A:
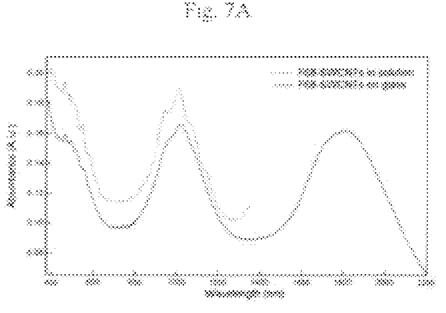
FIGS. 7A-B. SDGU-processed semiconducting SWCNT films on glass. (A) Optical absorbance spectra in solution and as a thin film on glass. By avoiding the water absorption band, thin film samples allow characterization of optical properties well into the infrared. (B) Digital images of vacuum filtered SWCNT films with varying sizes up to 1 in$^2$.
Figure 7B:
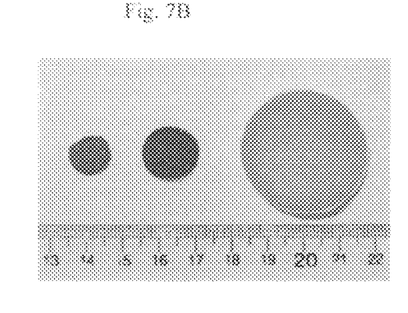

The utilization of SWCNTs in device fabrication often requires transfer from solution to thin film. For instance, by vacuum filtration of sorted SWCNT fractions onto a mixed-cellulose ester membrane with subsequent transfer of the SWCNT films onto a desired substrate via acetone vapor treatment (example 9, below). For example, SDGU fractions have been transferred onto glass substrates, which enables observation of their first-order optical transitions in the near-infrared (NIR) regime as shown in FIG. 7. This transfer process is easily scalable as the size of film can be controlled by varying the filtration setup, indicating that SDGU processed SWCNTs can be utilized in a variety of large area thin-film applications such as photovoltaics, chemical sensors, and integrated circuits.

Example 9

For film transfer onto a substrate, an SWCNT aqueous solution is pumped through a mixed cellulose ester (MCE)

membrane. The SWCNTs pile up on the MCE membrane, forming a film on the membrane surface. The membrane is placed on the substrate of interest (e.g., glass, $SiO_2$, etc.) with the SWCNT film face down (i.e., in contact with the target substrate). Exposed to acetone vapor, the MCE membrane dissolves and leaves only the SWCNT film on the target substrate.

As demonstrated, above, with procedures and equipment no more complicated than simple centrifugation and a Pasteur pipette, the present invention allows for the efficient collection of semiconducting SWCNTs with purities in excess of 99.5%. This streamlined, scalable process provides enhanced efficiency in terms of time and cost while generating the same quality and quantity of purified semiconducting SWCNTs when compared to previously established separation methods. Furthermore, the utilization of biocompatible block copolymers as opposed to conventional ionic surfactants introduces a new spectrum of possible biological applications. Regardless, the present invention affords a low cost route toward improved performance of a wide range of carbon nanotube devices.

We claim:

1. A method of using a density gradient to separate single-walled carbon nanotubes, said method comprising:
   providing a nanotube composition comprising at least one surface active block copolymer and a mixture of single-walled carbon nanotubes, said mixture selected from mixed nanotube diameters, mixed nanotube chiralities, mixed nanotube electronic types and combinations of said mixtures;
   contacting said nanotube composition with a fluid medium capable of forming a density gradient therein under centrifugation, and centrifuging said nanotube composition; and
   separating said nanotube composition into at least one separation fraction enriched with single-walled carbon nanotubes of at least one of said selected nanotube diameter, nanotube chirality and nanotube electronic type, said single-walled carbon nanotubes complexed with a said surface active block copolymer, said enrichment relative to said nanotube composition,
   said method without pre-centrifugation preparation of a linear density gradient.

2. The method of claim 1 comprising isolating at least one of said at least one separation fraction from said fluid medium.

3. The method of claim 2 comprising repeating said providing, contacting, centrifuging, separating and isolating, with at least one said isolated separation fraction.

4. The method of claim 3 wherein said repeating comprises changing from at least one of a preceding said surface active block copolymer and said fluid medium.

5. The method of claim 2 comprising removal of at least one said surface active block copolymer from said single-walled carbon nanotubes, in at least one said isolated separation fraction.

6. The method of claim 2 wherein a said surface active block copolymer is selected from linear and X-shaped amphiphilic poly(alkylene oxide) block copolymers and combinations thereof.

7. The method of claim 6 wherein a said linear amphiphilic block copolymer comprises poly(ethylene oxide) blocks and poly(propylene oxide) blocks.

8. The method of claim 7 wherein one said isolated separation fraction is enriched with semiconducting single-walled carbon nanotubes.

9. The method of claim 6 wherein an X-shaped amphiphilic block copolymer comprises poly(ethylene oxide) and poly(polypropylene oxide) blocks.

10. The method of claim 9 wherein one said isolated separation fraction is enriched with metallic single-walled carbon nanotubes.

11. The method of claim 1 wherein said fluid medium comprises aqueous iodixanol.

12. The method of claim 11 wherein a fraction of said centrifuged nanotube composition is isopycnic at a position along said formed density gradient.

13. A method of using a surface active block copolymer to separate single-walled carbon nanotubes, said method comprising:
   providing a fluid medium capable of forming a density gradient therein under centrifugation;
   providing a composition comprising at least one block poly(alkylene oxide) copolymer and a mixture of single-walled carbon nanotubes, said mixture comprising metallic and semiconducting single-walled nanotubes;
   centrifuging said composition in said fluid medium for at least one of a time and at a rotational rate sufficient to form said density gradient in said fluid medium, said block poly(alkylene oxide) copolymer inducing a nanotube buoyant density approximating a density along said density gradient; and
   separating said nanotube composition into at least one separation fraction enriched with one of said metallic and semiconducting single-walled nanotubes, said enrichment relative to said single-walled carbon nanotube composition.

14. The method of claim 13 wherein a said block poly(alkylene oxide) copolymer is selected from linear and X-shaped block poly(alkylene oxide) copolymers and combinations thereof.

15. The method of claim 14 wherein a said linear block copolymer comprises poly(ethylene oxide) and poly(propylene oxide) blocks.

16. The method of claim 15 wherein a said poly(ethylene oxide) block of a said linear block copolymer has a length greater than about 50 monomeric units.

17. The method of claim 16 wherein a said poly(propylene oxide) block of a said linear block copolymer has a length shorter than about 35 monomeric units.

18. The method of claim 15 comprising isolating at least one of said of least one separation fraction enriched with semiconducting single-walled carbon nanotubes.

19. The method of claim 14 wherein an X-shaped block poly(alkylene oxide) copolymer comprises poly(ethylene oxide) and poly(propylene oxide) blocks.

20. The method of claim 19 wherein a said poly(ethylene oxide) block of a said X-shaped block copolymer has a length greater than about 10 monomeric units.

21. The method of claim 20 wherein a said poly(propylene oxide) block of a said X-shaped block copolymer has a length greater than about 30 monomeric units.

22. The method of claim 19 comprising isolating at least one of said of least one separation fraction enriched with metallic single-walled carbon nanotubes.

23. The method of claim 13 wherein said fluid medium comprises aqueous iodixanol.

24. The method of claim 23 wherein a said block poly(alkylene oxide) copolymer is present at a concentration up to about 1% w/v in said fluid medium.

25. The method of claim 13 comprising isolation of at least one of said of least one separation fraction and deposition of said single-walled carbon nanotubes on a substrate.

26. A method of separating single-walled carbon nanotubes, said method comprising:
   providing a fluid medium capable of forming a density gradient therein under centrifugation;
   providing a composition comprising a single linear block poly(alkylene oxide) copolymer and a mixture of single-walled carbon nanotubes, said mixture comprising metallic and semiconducting nanotubes;
   centrifuging said composition in said fluid medium for at least one of a time and at a rotational rate sufficient to form said density gradient in said fluid medium, said linear block poly(alkylene oxide) copolymer inducing a nanotube buoyant density approximating a density along said density gradient; and
   separating said nanotube composition into at least one separation fraction enriched with semiconducting single-walled carbon nanotubes, said enrichment relative to said single-walled carbon nanotubes in said composition.

27. The method of claim 26 wherein a said linear block poly(alkylene oxide) copolymer comprises two poly(ethylene oxide) blocks and one poly(propylene oxide block, and a poly(ethylene oxide) block of said copolymer has a length greater than about 50 monomeric units.

28. The method of claim 27 wherein the poly(propylene oxide) block has a length shorter than about 35 monomeric units.

29. The method of claim 26 wherein said fluid medium comprises about 35%-about 40% iodixanol (w/v) in water.

30. The method of claim 29 wherein said fluid medium comprises about 35% iodixanol (w/v) and said composition is centrifuged less than about 10 hours.

31. The method of claim 30 wherein said composition is centrifuged about 4 hours to provide said at least one separation fraction comprising about 99.9% pure semiconducting single-walled carbon nanotubes.

* * * * *